(12) United States Patent
Golberg

(10) Patent No.: US 12,092,584 B2
(45) Date of Patent: Sep. 17, 2024

(54) HIGH THROUGHPUT DEFECT DETECTION

(71) Applicant: Applied Materials Israel Ltd., Rehovot (IL)

(72) Inventor: Boris Golberg, Ashdod (IL)

(73) Assignee: Applied Materials Israel Ltd., Rehovot (IL)

( * ) Notice: Subject to any disclaimer, the term of this patent is extended or adjusted under 35 U.S.C. 154(b) by 253 days.

(21) Appl. No.: 17/729,863

(22) Filed: Apr. 26, 2022

(65) Prior Publication Data
US 2023/0341334 A1    Oct. 26, 2023

(51) Int. Cl.
*G01N 21/88* (2006.01)
*G01N 21/956* (2006.01)

(52) U.S. Cl.
CPC ... *G01N 21/8851* (2013.01); *G01N 21/95623* (2013.01); *G01N 2021/8864* (2013.01)

(58) Field of Classification Search
CPC ......... G01N 21/8851; G01N 21/95623; G01N 2021/8864
See application file for complete search history.

(56) References Cited

U.S. PATENT DOCUMENTS

| | | | |
|---|---|---|---|
| 6,809,808 B2 | 10/2004 | Feldman et al. | |
| 7,365,836 B2* | 4/2008 | Some | G01N 21/9501 356/237.4 |
| 8,891,079 B2* | 11/2014 | Zhao | G01N 21/21 356/369 |
| 10,678,145 B2* | 6/2020 | Polo | G03F 7/70616 |

* cited by examiner

*Primary Examiner* — Hung V Nguyen
(74) *Attorney, Agent, or Firm* — Kilpatrick Townsend & Stockton LLP

(57) ABSTRACT

A method for high throughput defect detection, the method may include (i) performing, using first detection channels, a simultaneous inspection process through a segmented pupil plane that comprises multiple pupil plane segments to select one or more pupil plane segments of interest out of multiple pupil plane segments; (ii) configuring one or more configurable filters related to second detection channels to pass radiation received from the one or more pupil plane segment of interest and to block radiation received from one or more non-of-interest pupil plane segments; and (iii) performing, using the second detection channels, a partially masked pupil plane inspection process.

24 Claims, 4 Drawing Sheets

HIGH THROUGHPUT DEFECT DETECTION

BACKGROUND

The sensitivity of an inspection system may depend on various parameters—including but not limited to a signal to noise ratio (SNR) of radiation that reaches one or more sensors of the inspection system.

When inspecting a sample, radiation emitted from some regions of the sample may exhibit satisfactory SNR while radiation emitted from some other regions of the sample may exhibit a low SNR. The mapping between pixels that belong to satisfactory SNR regions and non-satisfactory SNR regions is not known in advance.

There is a growing need to determine in real-time which pixels belong to satisfactory SNR regions and which pixels belong to non-satisfactory SN regions.

SUMMARY

There may be provided a system, method and a non-transitory computer readable medium for high throughput defect detection.

There may be provided a high throughput inspection system, that may include first detection channels, second detection channels, illumination optics for illuminating a sample, a controller, and collection optics that may include one or more configurable filters. The collection optics is configured to collect radiation emitted from the sample due to the illuminating of the sample. The first detection channels are configured to generate detection signals during a simultaneous inspection process through a segmented pupil plane that comprises multiple pupil plane segments. The controller is configured to (a) select one or more pupil plane segments of interest out of multiple pupil plane segments, based on the detection signals generated by the first detection channels; and (b) configure one or more configurable filters related to second detection channels to pass radiation received from the one or more pupil plane segment of interest and to block radiation received from one or more non-of-interest pupil plane segments. The second detection channels that are configured to generate detection signals during a partially masked pupil plane inspection process.

There may be provided a method for high throughput defect detection, the method may include (i) performing, using first detection channels, a simultaneous inspection process through a segmented pupil plane that comprises multiple pupil plane segments to select one or more pupil plane segments of interest out of multiple pupil plane segments; (ii) configuring one or more configurable filters related to second detection channels to pass radiation received from the one or more pupil plane segment of interest and to block radiation received from one or more non-of-interest pupil plane segments; and (iii) performing, using the second detection channels, a partially masked pupil plane inspection process.

There may be provided a non-transitory computer readable medium for high throughput defect detection, the non-transitory computer readable medium may include (i) performing, using first detection channels, a simultaneous inspection process through a segmented pupil plane that comprises multiple pupil plane segments to select one or more pupil plane segments of interest out of multiple pupil plane segments; (ii) configuring one or more configurable filters related to second detection channels to pass radiation received from the one or more pupil plane segment of interest and to block radiation received from one or more non-of-interest pupil plane segments; and (iii) performing, using the second detection channels, a partially masked pupil plane inspection process.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
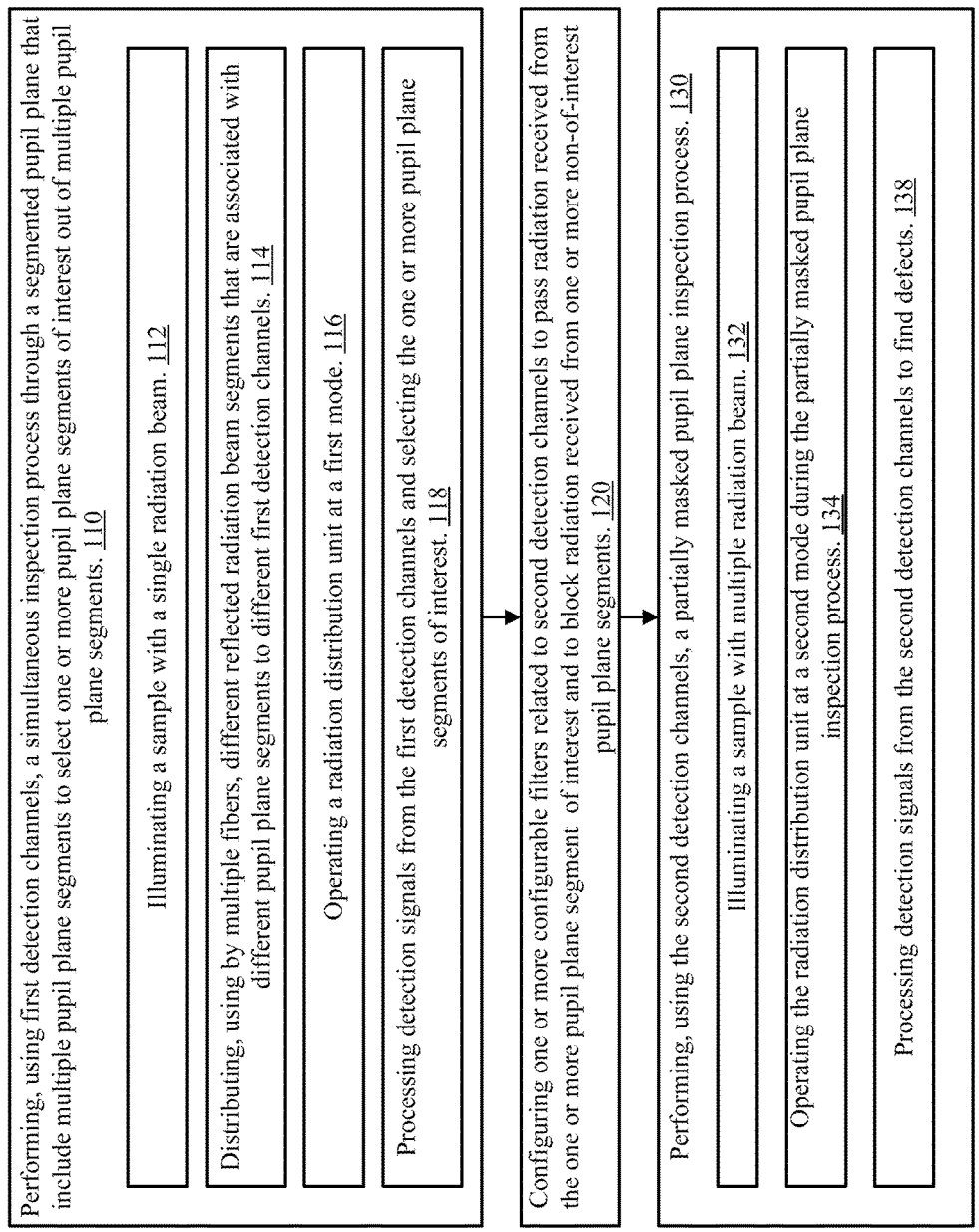
FIG. 1 is an example of a method.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

The term "corresponding" when referring to different images means located at the same location in the different images—for example at a same combination of row value and column value.

The term "region" of a sample may be the entire sample or only one or more parts of the region. The sample may be a semiconductor wafer or another sample.

FIG. 1 illustrates a method 100 for high throughput defect detection.

Method 100 may start by step 110 of performing, using first detection channels, a simultaneous inspection process through a segmented pupil plane that includes multiple pupil plane segments, to select one or more pupil plane segments of interest out of multiple pupil plane segments.

Light scattered from a pupil plane segment of interest may (i) be indicative of a suspected defect, or (ii) fulfill an SNR requirement (for example having at least a certain SNR value), or (ii) may be indicative a suspected defect and also fulfill a signal to noise ration.

A selection of a pupil plane segment of interest associated with radiation that fulfills the SNR requirement may increase the sensitivity of the detection of defects—as it results in blocking radiation from non-satisfactory SNR regions.

When selecting a pupil plane segment of interest associated with a suspected defect—the method may block radiation from pupil plane segments.

Step 110 may include step 112 of illuminating a sample with a single radiation beam.

Step 110 may include step 114 of distributing, using multiple fibers, different reflected radiation beam segments that are associated with different pupil plane segments to different first detection channels. For example—each first detection channel may receive radiation from a unique pupil plane segment.

Step 110 may include step 116 of operating a radiation distribution unit at a first mode.

Step 110 may include step 118 of processing first detection signals from the first detection channels and selecting the one or more pupil plane segments of interest.

Step 110 may be followed by step 120 of configuring one or more configurable filters related to second detection channels to pass radiation received from the one or more pupil plane segment of interest and to block radiation received from one or more non-of-interest pupil plane segments.

Steps 110 and 120 may increase the sensitivity of the inspection process while tailoring the inspection process to obtain and process light from pupil plane segments of interest.

By using the segmented pupil plane—steps 110 and 120 may define one or more configurable filters at a finer resolution—at a pupil plane segment resolution.

Step 120 may be followed by step 130 of performing, using the second detection channels, a partially masked pupil plane inspection process.

There may be any number of first detection channels, any number of second detection channels, and any relationship between the number of the first detection channels and the second detection channels.

A detection channel may operate during step 110 as a first detection channel and may operate, during step 130, as a second detection channel. Alternatively—a detection channel may be only a first detection channel or only a second detection channel.

Step 130 may include step 132 of illuminating the sample with multiple radiation beams.

Step 130 may include step 134 of operating the radiation distribution unit at a second mode. This includes may include distributing radiation from different radiation beams to different second detection channels. This step includes passing the radiation through the one or more configurable filters related to the second detection channels.

Step 130 may include step 138 of processing second detection signals from the second detection channels to find defects.

Figure 2:
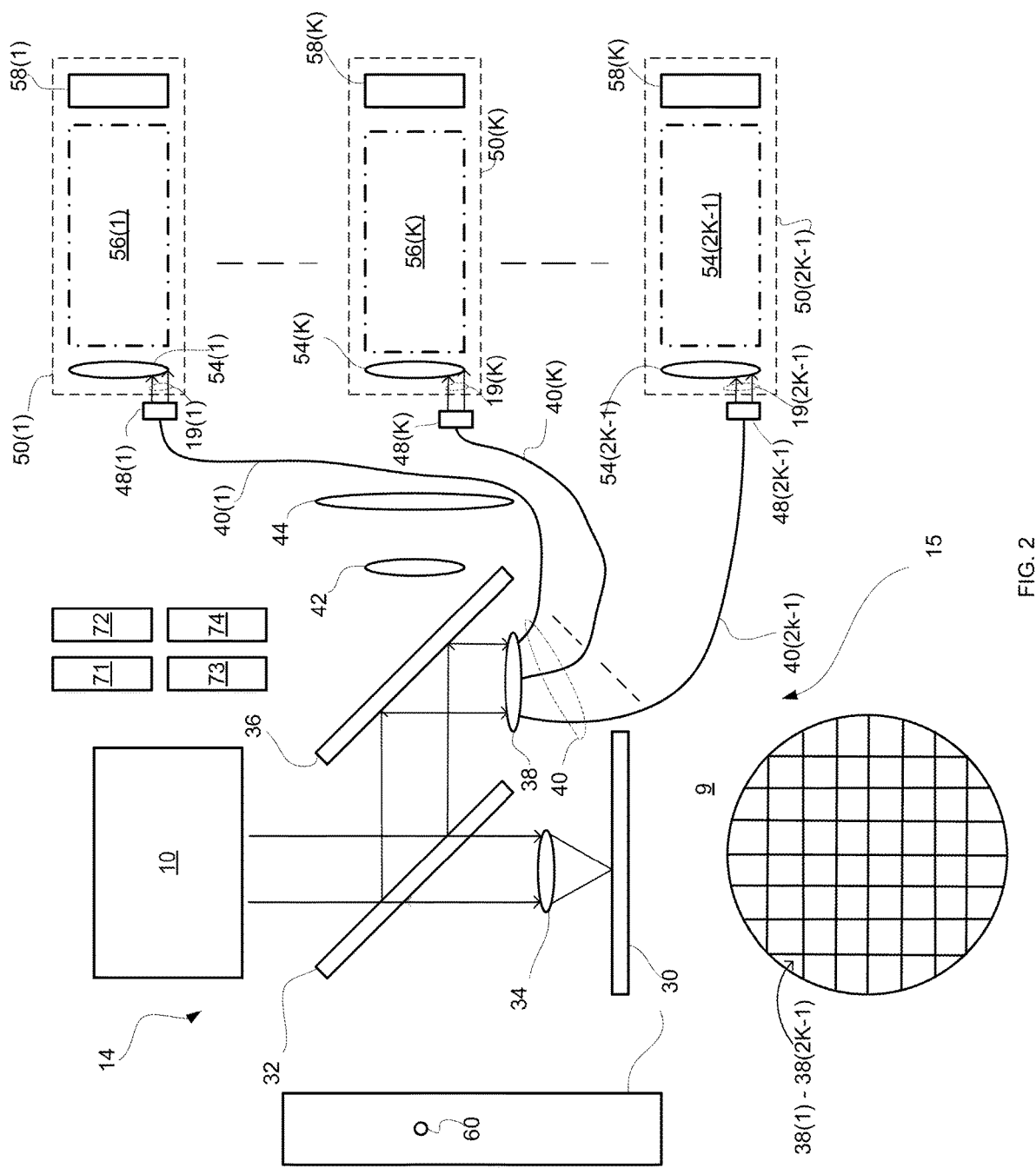
FIG. 2 is an example of an inspection system.

It should be noted that step 110 may include scanning the sample with a first number (N1) of radiation beams and step 130 may include scanning the sample with a second number (N2) of radiation beams—whereas N2 may exceed N1, N1 may equal one or may exceed one, and assuming that there are a third number (N3) of second detection channels, N3 may equal N2 or differ from N2. In FIG. 2 and in FIG. 3 the first detection channels are also the second detection channels, N3 equals N2 that equals 2K+1. K, N1, N2 and N3 are positive integers.

FIG. 2 illustrates an example of an inspection system 9, and a sample 30 during the simultaneous inspection process through the segmented pupil plane.

Inspection system 9 includes an illumination module 10 that illuminates sample 30 with a single radiation beam 12 that passes through beam splitter 32, impinges on objective lens 34 and is focused onto sample 30 (forming a single spot 60). Illumination module 10, beam splitter 32, and objective lens 34 belong to illumination optics 14.

Scattered radiation from the sample is collected by objective lens 34 and is directed through mirror 36 to a distribution lens 38. The mirror is present during the simultaneous inspection process through a segmented pupil plane, and is absent during the partially masked pupil plane inspection process. The mirror may be replaced by a configurable beam splitter.

The distribution lens 38 is located at a distribution plane. A configurable filter 42 is located within a pupil plane. The distribution plane and the pupil are conjugated planes. The configurable filter 42 is utilized during the partially masked pupil plane inspection process.

The distribution lens 38 distributes the scattered light to multiple fibers—one fiber per one distribution lens plane segment. The distribution lens plane segments are denoted 38(1)-38(2K-1).

The multiple fibers are collectively denoted 40 and are individually denoted 40(1)-40(2K-1). The multiple fibers convey radiation from different distribution lens plane segments—one distribution lens plane segment per fiber.

Being conjugated planes—each distribution lens plane segment has a corresponding pupil plane segment.

The multiple fibers are followed by fiber output optics 48(1)-34(2K-1) (for example collimation lenses) that send the radiation that propagated through the multiple fibers to first detection channels 50(1)-50(2K-1). The first detection channels include input lens 54(1)-54(2K-1) (such as manifold lenses), intermediate optics 56(1)-56(2K-1), and sensors 58(1)-58(2K-1).

The sensors are configured to generate first detection signals that may be processed by processor 71 to select the one or more pupil plane segments of interest. The intermediate optics may include a fiber, and one or more additional lenses. The inspection system may be controlled by controller 72 and may also include memory 73, and a communication unit or an interface 74 for communicating with other systems.

Beam splitter 32, objective lens 34, mirror 36, distribution lens 38, configurable filter 42, multiple fibers 40 and fiber output optics 48(1)-34(2K-1) belong to collection optics 15 of the inspection system.

Figure 3:
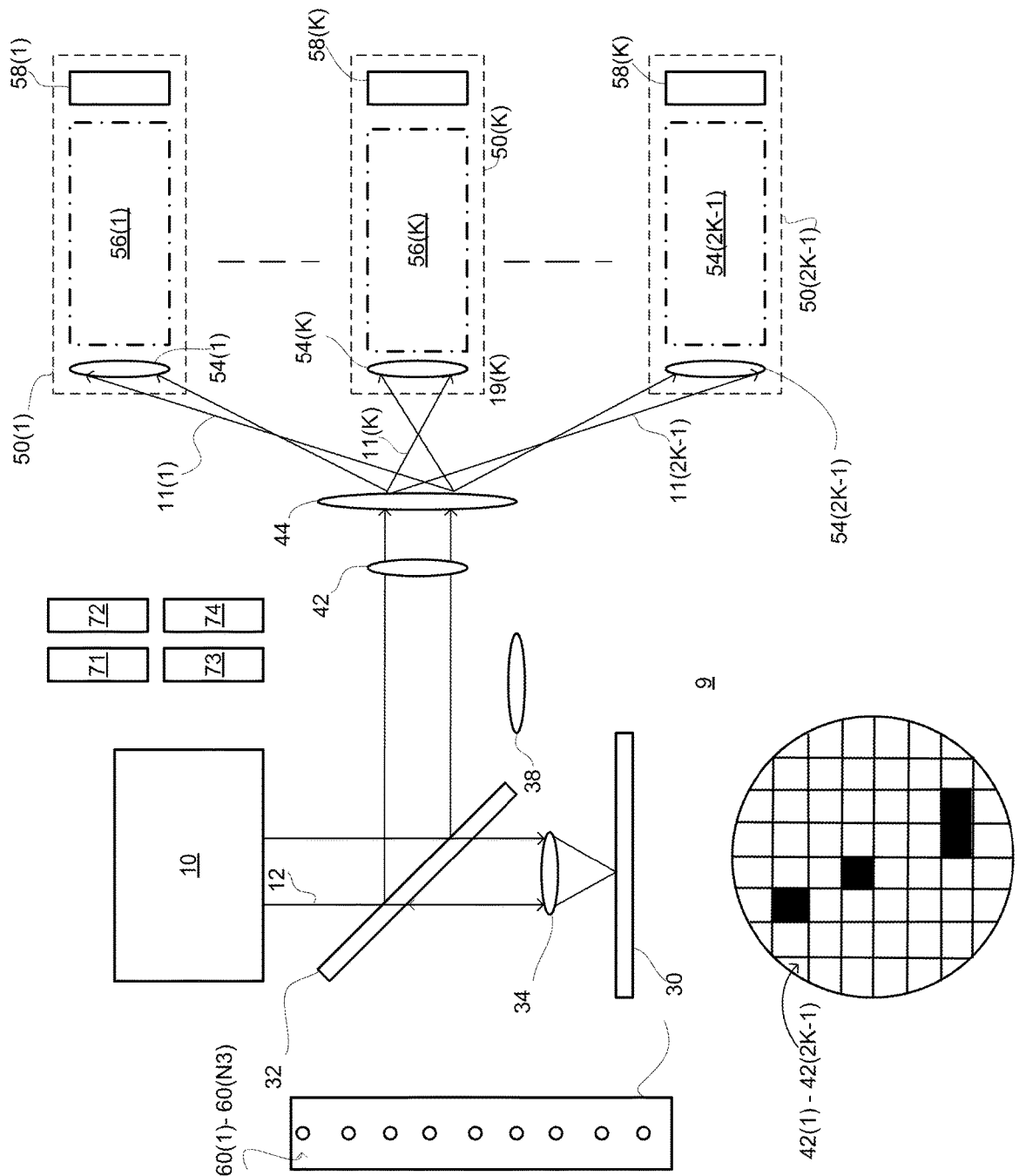
FIG. 3 is an example of an inspection system.

FIG. 3 illustrates an example of an inspection system 9, and a sample 30 during the partially masked pupil plane inspection process.

For simplicity of explanation, the fibers and the fiber output optics are not illustrated in FIG. 3.

Inspection system 9 includes illumination module 10 that illuminates sample 30 with a multiple radiation beams 12 (due to the side view only one beam is illustrated). The multiple radiation beams pass through beam splitter 32, impinge on objective lens 34 and are focused onto sample 30 (forming multiple spots 60(1)-60(2K-1)). In FIG. 3 the spots may form an array having a longitudinal axis that extends outside FIG. 3. The spots may form a two dimensional array or may be ordered in any other manner. Relative movement may be introduced between the sample and the illumination module 10.

The illumination module 10 may form multiples travelling lenses within an acousto-optic medium and the multiple travelling lenses may focus radiation to form the multiple spots on the sample. An example of an inspection system that has travelling lens forming optics is illustrated in U.S. Pat. No. 6,809,808 which is incorporated herein by reference.

Scattered radiation from the sample is collected by the objective lens 34 and propagates (at the absence of mirror 36) to configurable filter 42.

Configurable filter 42 includes configurable filter segments 41(1)-42(2K-1) and is configured to pass radiation received from the one or more pupil plane segment of interest and to block (see black segments) radiation received from one or more non-of-interest pupil plane segments.

The configurable filter 42 is followed by a lens such as tube lens 44 that is configured to distribute radiation scattered from different spots (the radiation is denoted 11(1)-11(2K-1) to different second detection channels—which in FIG. 3 are the same detection channels as in FIG. 2. The tube lens 44 may be replaced by another type of lens.

The processor and/or the controller may include one or more processing circuits. A processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Figure 4:
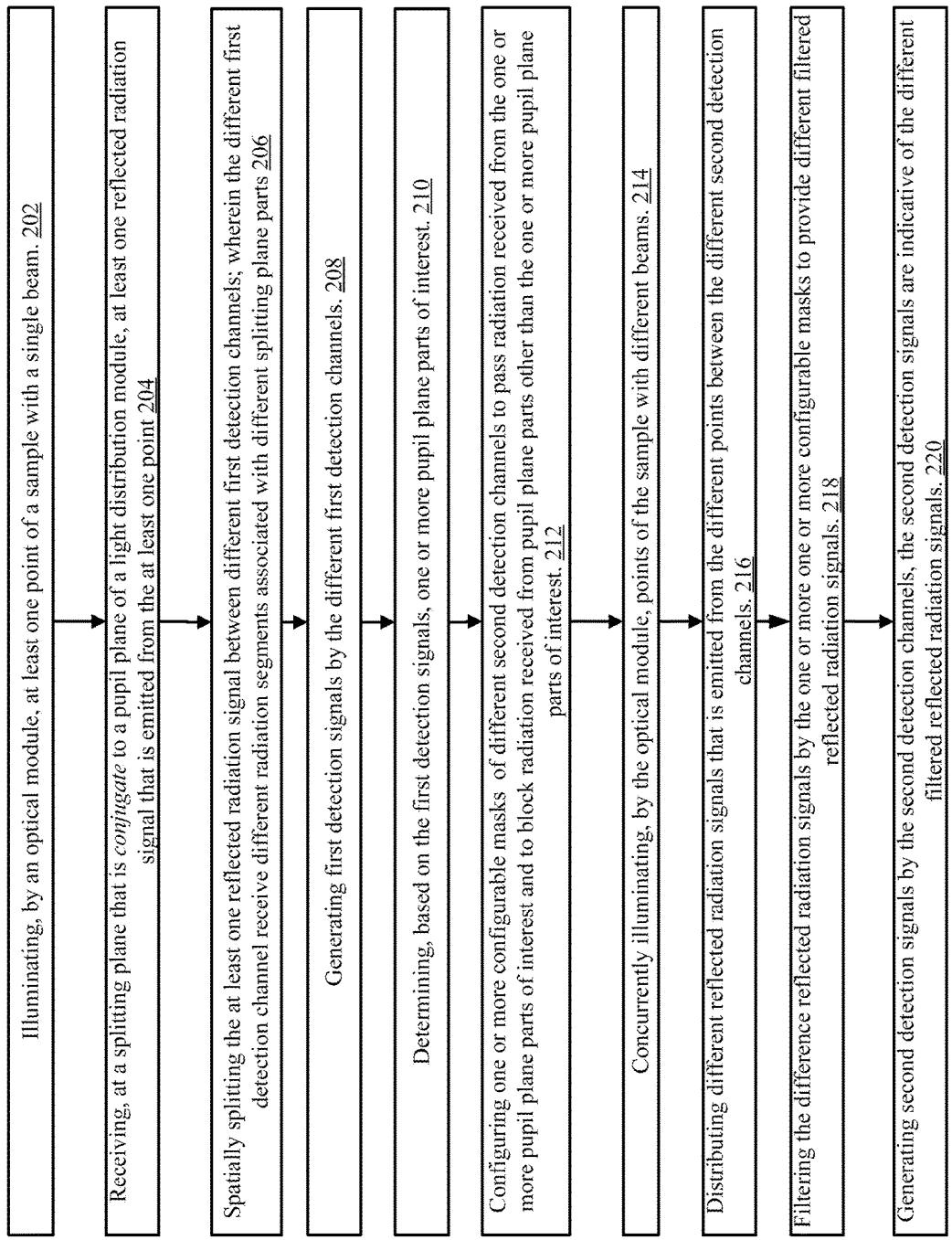
FIG. 4 is an example of a method.

FIG. 4 illustrates method 200 for high throughput defect detection.

Method 200 may include:
 (a) Illuminating, by an optical module, at least one point of a sample with a single beam. S202.
 (b) Receiving, at a splitting plane that is conjugate to a pupil plane of a light distribution module, at least one reflected radiation signal that is emitted from the at least one point. S204.
 (c) Spatially splitting the at least one reflected radiation signal between different first detection channels; wherein the different first detection channel receive different radiation segments associated with different splitting plane parts. S206
 (d) Generating first detection signals by the different first detection channels. S208
 (e) Determining, based on the first detection signals, one or more pupil plane parts of interest. S210
 (f) Configuring one or more configurable masks of different second detection channels to pass radiation received from the one or more pupil plane parts of interest and to block radiation received from pupil plane parts other than the one or more pupil plane parts of interest. S212.
 (g) Concurrently illuminating, by the optical module, points of the sample with different beams. S214.
 (h) Distributing different reflected radiation signals that is emitted from the different points between the different second detection channels. S216.
 (i) Filtering the difference reflected radiation signals by the one or more one or more configurable masks to provide different filtered reflected radiation signals. S218.
 (j) Generating second detection signals by the second detection channels, the second detection signals are indicative of the different filtered reflected radiation signals. S220.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

I claim:

1. A method for high throughput defect detection using an inspection system configured to detect defects on a sample, the method comprises:
    illuminating the sample with a radiation beam;
    receiving scattered portions of the radiation beam at a distribution lens of the inspection system, the distribution lens partitioned into a plurality of distribution lens plane segments;
    directing the scattered portions of the radiation beam received at the plurality of distribution lens plane segments to first detection channels, wherein the scattered portions of the radiation beam received at each of the plurality of distribution lens plane segments is directed to a different one of the first detection channels;
    identifying one or more of the plurality of distribution lens plane segments as a segment of interest based on the scattered portions of the radiation beam received at the first detection channels, wherein the plurality of distribution lens plane segments have corresponding pupil plane segments, and the pupil plane segments associated with the segments of interest are identified as pupil plane segments of interest;
    configuring a configurable filter associated with second detection channels, wherein the configurable filter has configurable filter segments each associated with one of the pupil plane segments, and the configurable filter is configured to pass radiation on the pupil plane segments of interest and to block radiation on all other pupil plane segments (hereinafter non-of-interest pupil plane segments); and
    performing, using the second detection channels, a partially masked pupil plane inspection process.

2. The method according to claim 1 wherein at least one first detection channel is also at least one second detection channel.

3. The method according to claim 1 comprising selecting a pupil plane segment of interest when determining that a scattered light associated with the pupil plane segment is indicative of a suspected defect.

4. The method according to claim 1 comprising selecting a pupil plane segment of interest when determining that a scattered light associated with the pupil plane segment is indicative of a suspected defect and fulfills a signal to noise ratio requirement.

5. The method according to claim 1 wherein at least one first detection channel differs from at least one second detection channel.

6. The method according to claim 1 wherein the partially masked pupil plane inspection process comprises illuminating the sample with multiple radiation beams.

7. The method according to claim 1 wherein illuminating the sample comprises distributing, using multiple fibers, different reflected radiation beam segments that are associated with different pupil plane segments to different first detection channels.

8. The method according to claim 1 comprising operating a radiation distribution unit at a first mode through the segmented pupil plane, and operating the radiation distribution unit at a second mode during the partially masked pupil plane inspection process.

9. A non-transitory computer readable medium for high throughput defect detection using an inspection system configured to detect defects on a sample, the non-transitory computer readable medium containing instructions for causing the inspection system to perform a method that comprises:
    illuminating the sample with a radiation beam;
    receiving scattered portions of the radiation beam at a distribution lens of the inspection system, the distribution lens partitioned into a plurality of distribution lens plane segments;
    directing the scattered portions of the radiation beam received at the plurality of distribution lens plane segments to first detection channels, wherein the scattered portions of the radiation beam received at each of the plurality of distribution lens plane segments is directed to a different one of the first detection channels;
    identifying one or more of the plurality of distribution lens plane segments as a segment of interest based on the scattered portions of the radiation beam received at the first detection channels, wherein the plurality of distribution lens plane segments have corresponding pupil plane segments, and the pupil plane segments associated with the segments of interest are identified as pupil plane segments of interest;
    configuring a configurable filter associated with second detection channels, wherein the configurable filter has configurable filter segments each associated with one of the pupil plane segments, and the configurable filter is configured to pass radiation on the pupil plane segments of interest and to block radiation on all other pupil plane segments (hereinafter non-of-interest pupil plane segments); and performing, using the second detection channels, a partially masked pupil plane inspection process.

10. The non-transitory computer readable medium according to claim 9 wherein at least one first detection channel is also at least one second detection channel.

11. The non-transitory computer readable medium according to claim 9 comprising instructions for selecting a pupil plane segment of interest when determining that a scattered light associated with the pupil plane segment is indicative of a suspected defect.

12. The non-transitory computer readable medium according to claim 9 comprising instructions for selecting a pupil plane segment of interest when determining that a scattered light associated with the pupil plane segment is indicative of a suspected defect and fulfills a signal to noise ratio requirement.

13. The non-transitory computer readable medium according to claim 9 wherein at least one first detection channel differs from at least one second detection channel.

14. The non-transitory computer readable medium according to claim 9 wherein the partially masked pupil plane inspection process comprises illuminating the sample with multiple radiation beams.

15. The non-transitory computer readable medium according to claim 9 wherein illuminating the sample comprises instructions for distributing, using multiple fibers, different reflected radiation beam segments that are associated with different pupil plane segments to different first detection channels.

16. The non-transitory computer readable medium according to claim 9 comprising instructions for operating a radiation distribution unit at a first mode through the segmented pupil plane, and operating the radiation distribution unit at a second mode during the partially masked pupil plane inspection process.

17. A high throughput inspection system, comprising:
first detection channels;
second detection channels;
illumination optics for illuminating a sample with a radiation beam;
collection optics that comprise a configurable filter;
wherein the collection optics is configured to collect radiation emitted from the sample due to the illuminating of the sample
a controller
configured to:
(a) illuminate the sample using the illumination optics;
(b) receive scattered portions of the radiation beam at a distribution lens of the collection optics, the distribution lens partitioned into a plurality of distribution lens plane segments;
(c) direct the scattered portions of the radiation beam received at the plurality of distribution lens plane segments to the first detection channels, wherein the scattered portions of the radiation beam received at each of the plurality of distribution lens plane segments is directed to a different one of the first detection channels;
(d) identify one or more of the plurality of distribution lens plane segments as a segment of interest based on the scattered portions of the radiation beam received at the first detection channels, wherein the plurality of distribution lens plane segments have corresponding pupil plane segments, and the pupil plane segments associated with the segments of interest are identified as pupil plane segments of interest;
(e) configure the configurable filter associated with the second detection channels, wherein the configurable filter has configurable filter segments each associated with one of the pupil plane segments. and the configurable filter is configured to pass radiation on the one pupil plane segments of interest and to block radiation on all other pupil plane segments (hereinafter non-of-interest pupil plane segments); and
(f) perform, using the second detection channels, a partially masked pupil plane inspection process.

18. The high throughput inspection system according to claim 17 wherein at least one first detection channel is also at least one second detection channel.

19. The high throughput inspection system according to claim 17 wherein the controller is configured to select a pupil plane segment of interest when determining that a scattered light associated with the pupil plane segment is indicative of a suspected defect.

20. The high throughput inspection system according to claim 17 wherein the controller is configured to select a pupil plane segment of interest when determining that a scattered light associated with the pupil plane segment is indicative of a suspected defect and fulfills a signal to noise ratio requirement.

21. The high throughput inspection system according to claim 17 wherein at least one first detection channel differs from at least one second detection channel.

22. The high throughput inspection system according to claim 17 wherein the illumination optics is configured to illuminate the sample with multiple radiation beams during the partially masked pupil plane inspection process.

23. The high throughput inspection system according to claim 17 wherein the collection optics comprise multiple fibers that are configured to distribute different reflected radiation beam segments that are associated with different pupil plane segments to different first detection channels.

24. The high throughput inspection system according to claim 17 wherein the collection optics comprise a radiation distribution unit that is configured to operate at a first mode through the segmented pupil plane, and is configured to operate at a second mode during the partially masked pupil plane inspection process.

\* \* \* \* \*